US005845278A

United States Patent [19]
Kirsch et al.

[11] Patent Number: 5,845,278
[45] Date of Patent: Dec. 1, 1998

[54] METHOD FOR AUTOMATICALLY SELECTING COLLECTIONS TO SEARCH IN FULL TEXT SEARCHES

[75] Inventors: Steven T. Kirsch, Los Altos; William I. Chang, Mountain View, both of Calif.

[73] Assignee: Inioseek Corporation, Sunnyvale, Calif.

[21] Appl. No.: 928,542

[22] Filed: Sep. 12, 1997

[51] Int. Cl.⁶ ........................................ G06F 17/30
[52] U.S. Cl. .............. 707/3; 707/1; 707/4; 707/5; 707/102; 707/103
[58] Field of Search ................... 707/1, 5, 4, 3, 707/102, 103

[56] References Cited

U.S. PATENT DOCUMENTS

| | | | |
|---|---|---|---|
| 5,418,961 | 5/1995 | Segal | 707/1 |
| 5,488,725 | 1/1996 | Turtle | 707/3 |
| 5,659,732 | 8/1997 | Kirsch | 707/5 |
| 5,727,156 | 3/1998 | Herr-Hoyman | 395/200.49 |
| 5,752,249 | 5/1998 | Macon | 707/103 |

*Primary Examiner*—Thomas G. Black
*Assistant Examiner*—Diane D. Mizrahi
*Attorney, Agent, or Firm*—Fliesler, Dubb, Meyer & Lovejoy, LLP

[57] ABSTRACT

A method of selecting a subset of a plurality of document collections for searching in response to a predetermined query is based on accessing a meta-information data file that describes the query significant search terms that are present in a particular document collection correlated to normalized document usage frequencies of such terms within the documents of each document collection. By access to the meta-information data file, a relevance score for each of the document collections is determined. The method then returns an identification of the subset of the plurality of document collections having the highest relevance scores for use in evaluating the predetermined query. The meta-information data file may be constructed to include document normalized term frequencies and other contextual information that can be evaluated in the application of a query against a particular document collection. This other contextual information may include term proximity, capitalization, and phraseology as well as document specific information such as, but not limited to collection name, document type, document title, authors, date of publication, publisher, keywords, summary description of contents, price, language, country of publication, publication name. Statistical data for the collection may include such as, but not limited to number of documents in the collection, the total size of the collection, the average document size and average number of words in the base document collection.

20 Claims, 3 Drawing Sheets

METHOD FOR AUTOMATICALLY SELECTING COLLECTIONS TO SEARCH IN FULL TEXT SEARCHES

BACKGROUND OF THE INVENTION

1. Field of the Invention

The present invention is generally related to full text document searching and retrieval, as may be performed over local and wide-area networks, and in particular to a method of performing effective document searches over multiple, independent document collections.

2. Description of the Related Art

During the past few years, the quantity and diversity of information and services available over the public (Internet-type) and private (Intranet-type) local and wide area networks, generically referred to as the "Internet," has grown substantially. In particular, the variety of information accessible through such Internet based services is growing rapidly both in terms of scope and depth.

One of the significant benefits of information being accessible over the Internet is that very diverse information can be accessed in a largely presentation independent form. A number of independent Internet search services exist to provide context based, content derived indexes searchable over the Internet through a query based interface. Consequently, much if not all of the diverse information available through the Internet can be found and utilized by individuals and companies, or simply "users," who use the Internet.

While access to much of the information available through the Internet is free for public use, numerous proprietary or fee-based access document collections exist. Although such private document collections may all be accessible through the Internet, which is increasingly preferred over the many existing proprietary modem networks, the collections are generally forced to be accessible as discrete entities in order to maintain fee-based access control. In effect, such private document collections are restricted to use on a collection access for fee basis.

Private document collections are likely to continue to exist as significant sources of unique information. Independent content creators and providers derive significant revenues from the licensing of private collection content typically to collection access providers who, in turn, derive revenue from fee-based access by users to various available combinations of private collections.

In order to maximize the desirability for users to access a particular private collection and preferably related sets of private collections, a collection access provider will acquire licensed rights to make available a wide variety of individual collections of content related documents as discrete databases that can be manually selected for search by a user. Typically, searches and retrievals of information from the discrete databases are subject to specific access fees determined based on the relative commercial worth of the information maintained in the individual databases. Consequently, access fees are typically calculated on the number of documents that are variously searched, reviewed, and retrieved in preparation of a search report from a particular database.

A known problem in providing access to multiple databases is the relative difficulty or inefficiency in identifying an optimal database or set of databases that should be searched to obtain the best search report for a some particular unstructured, or ad hoc, database query. In order to support even the possibility of ad hoc queries, the database search must be conducted on a full text or content established basis. Existing full text search engines typically allow a user to search many databases simultaneously. For example, commercial private collection access providers, such as Dialog, allow a user to search some 500 or more different databases either individually or in manually selected sets. Consequently, the selection of a most appropriate set of databases to search places a substantial burden on the user for each query. The user must manually determine and select a particular set of databases that must, by definition, contain the desired results to a query. Such a database set selection is difficult since the selection is made preemptively and independent of the query. This burden may be even more of an issue where access fees are charged for conducting a search against a database even where no search responsive documents are found or examined. In the aggregate, this problem is typically referred to as the "collection selection problem."

The collection selection problem is complicated further when the opportunity and desire exists to search any combination of public and private document collections. The Internet effectively provides the opportunity to access many quite disparately located and maintained databases. The importance of solving the selection collection problem thus derives from the user's desire to ensure that, for a given ad hoc query, the best and most comprehensive set of possible documents will be returned for examination and potential use at minimum cost.

The collection selection problem is formidable even when dealing with a single collection provider. Dialog, an exemplary collection access provider, alone provides access to over 500 separate databases, many with indistinct summary statements of scope and overlapping coverage of topics. With over 50,000 databases estimated presently available on the Internet, the collection selection problem is therefore impractical to solve reliably and efficiently by a user.

Some approaches to providing automated or at least semi-automated solutions to the collection selection problem have been developed. Known techniques, such as WAIS (wide area information server), utilize a "server of servers" approach. A "master" database is created to contain documents that describe the contents of other "client" databases as may be potentially available on the Internet. A user first selects and searches the master database to identify a set of client databases that can then be searched for the best results for a given query.

In many instances, a master WAIS database is constructed and updated manually. The master database can also be generated at least semi-automatically through the use of automatons that collect information freely from the Internet. The performance of such automatons, however, is often imperfect, if not simply incorrect, in their assessments of client databases. Even at best, certain client databases, including typically private and proprietary document collections, may block access by the automatons and are thus completely unrepresented in the master database.

Even where database access can be obtained and document summaries automatically generated, the scaling of the master database becomes problematic if only due to the incomplete, summary, and mis-characterization of document summary entries in the master database. Manual intervention to prepare and improve automaton generated document summaries will enhance the usefulness of the master database. When any manual intervention is required, however, the scaling of the master database comes at least at the expense of the useful content of the master database document summary entries. With greatly increased scale, often only abbreviated document titles or small fractions of the client database documents can be collected as summaries into the master database. As scale increases, succinct manually generated summaries of client database documents become increasingly desired, if not required, to provide any adequate content for the master database document entries. Unfortunately, even at only a modest scale, a master database of manually generated or modified document summaries becomes an impracticable construct to build or maintain.

Perhaps one of the most advanced scalable approaches to constructing and using a meaningful master database is a system known as GLOSS (Glossary-of-Servers Server). An automaton is typically used to prepare a master database document for each client database that is to be included within GLOSS. Each master database document effectively stores the frequency of whatever potential query terms occur within the corresponding client collection of documents. The master database documents are then stored as the master records that collectively form the master database.

In response to a user query, GLOSS operates against the master database documents to estimate the number of relevant client collection documents that exist in the respective client collections. These relevant document estimates are determined from a calculation based on the combined query term frequencies within each of the master database documents. GLOSS then assumes that client databases ranked as having the greatest number of combined query term occurrences are the most relevant databases to then search.

Unfortunately, utilizing a relevance system based on term frequency inherently constrains the type and effectiveness of queries that can be meaningfully directed against the master database. In addition, the estimator used by GLOSS is by definition aspecific to any client document. The GLOSS system is therefore highly subject to failures to identify client databases that may contain only a relatively few instances of the query terms, yet may contain relevant documents.

Other approaches to establishing a quantitative basis for selecting client database sets includes the use of comprehensive indexing strategies, ranking systems based on training queries, expert systems using rule-based deduction methodologies, and inference networks. These approaches are used to examine knowledge base descriptions of client document collections.

Indexing and ranking systems both operate typically against the client databases directly to, in effect, create categorizations of the client databases against search term occurrences. All possible query terms are indexed in the case of comprehensive indexing, while a limited set of predefined or static query terms are used in the case of simple ranking. Indexing thus generates a master database of selectable completeness that is nonetheless useable for selecting a most likely relevant set of client databases for a particular query. Ranking also generates a master database, though based on the results of a limited set of broad test queries intended to collectively categorize subsets of the available client databases. In effect, categorization by fixed query term results in generally orthogonal lists of ranked client database sets.

Expert system approaches typically operate on client database scope and content descriptions to deduce or establish a basis for subsequently deducing a most likely set of databases that will likely contain the most relevant documents for a particular query.

Finally, inference networks utilize a term-frequency based probabilistic approach to estimating the relevance of a particular client database as against other client databases. Unfortunately, the known implementations of inference networks are unable to accurately rank the potential relevance of client databases of diverse size and differences in the generation of summaries for each of the client databases considered.

Thus, the known approaches to solving the client database collection selection problem are generally viewed as inefficient in the assembly, construction, and maintenance of a master document database. These known systems are also viewed as often ineffective in identifying the likely most relevant documents within entire sets of collections because real world collections are often highly variable in size, scope, and content or cannot be uniformly characterized by existing quantitative approaches.

Another and perhaps practically most significant limitation of these known systems is that each must be self-contained in order to operate. This is a direct result of each system utilizing a proprietary algorithm, whether implemented as a manual operation or through the operation of an automaton, to universally assemble the information necessary to create or populate the master database documents from the raw collection documents. As such, these known systems cannot depend on one-another or on any other indexing systems; each must be responsible for both the total generation and subsequent exclusive utilization of their master database summary record documents.

Consequently, there is a clear need for an enhanced system of handling the collection selection problem in view of the ever increasing number and scale of collections available on the Internet and the increasing variety of the collections, both in terms of existing organization and informational content.

SUMMARY OF THE INVENTION

Thus, a general purpose of the present invention is to provide an efficient and effective method of selecting the likely most relevant collections for searching based on an ad hoc query.

This is achieved in the present invention by providing a method of selecting a subset of a plurality of document collections for searching, in response to a predetermined query, based on accessing a meta-information data file that correlates the query significant search terms present in a particular document collection with normalized document usage frequencies of such terms within the documents of each document collection and a normalized document collection frequency of documents that include the search significant terms within the set of document collections. By access to the meta-information data file, a relevance score for each of the document collections is determined. The method then returns an identification of the subset of the plurality of document collections having the highest relevance scores for use in evaluating the predetermined query.

The meta-information data file may be constructed to include document normalized term frequencies and other contextual information that can be evaluated in the application of a query against a particular document collection. This contextual information may include term proximity, capitalization, and phraseology as well as document specific information such as, but not limited to collection name, document type, authors, date of publication, publisher, keywords, summary description of contents, price, language, country of publication, number of documents included in collection, and publication name. For example, a user can specify a relatively simple collection selection criterion such as contains the phrase "cure for AIDS" or as complex as "search all newspaper collections costing less than 10 cents per document found and where more than 10% of the documents contain the word computer and that contain the phrases 'Bill Gates' and 'Windows95'."

An advantage of the present invention is that the method provides for both automated and manual description to be used in selecting collections that contain the most likely relevant documents in relation to an ad hoc query.

Another advantage is that both hard boolean selection terms, such as "document type is newspaper," may be combined with soft terms, such as "choose the 10 collections containing the most articles about 'Bill Gates'."

A further advantage of the present invention is that the method makes use of term proximity, capitalization, phraseology and other information in establishing a relevance ranking of the collections with respect to an ad hoc query.

Still another advantage of the present invention is that the method can operate to create and maintain a meta-index database based on whatever information may be gleaned from existing proprietary database indexes for the collections that may be searched.

Yet another advantage of the present invention is that the method may operate from a meta-index database created from standardized format collection statistics summary files autonomously developed from the individual collections and preferably from the collection indexes. By using the collection indexes directly as the source of information for the summary files, the present invention establishes an independence from the proprietary algorithms used in creating the source collection indexes.

A still further advantage of the present invention is that the construction of the collection statistics summary files from collection indexes and, in turn, the construction of the meta-index database from the statistics summary files can and preferably does preserve substantial collection and document specific information such as, but not limited to collection name, document type, authors, date of publication, publisher, keywords, summary description of contents, price, language, country of publication, publication name, number of documents in the collection, the total size of the collection, the average document size and average number of words in the base document collection for use in evaluating collection relevance to a potentially complex and qualified ad hoc query.

Still another advantage of the present invention is that a number of different ranking algorithms can be used to identify the likely most relevant collections depending in-part potentially on the particular summary information available for each collection considered. The ranking algorithms used may also variably use proximity, capitalization and other contextual information if and as preserved through the construction of the meta-index database, thereby maximizing the efficiency of the present invention in identifying the likely most relevant collections to search.

A yet further advantage of the present invention is that utilization of the collection indexes, with their basic document location and term content data, as the source information for the summary files allows per document and collection statistics to be gathered. These statistics allow documents that have a significant likelihood of relevance to be identified in collections of documents that are otherwise seemingly irrelevant to a particular ad hoc query.

BRIEF DESCRIPTION OF THE DRAWINGS

These and other advantages and features of the present invention will become better understood upon consideration of the following detailed description of the invention when considered in connection of the accompanying drawings, in which like reference numerals designate like parts throughout the figures thereof, and wherein.

DETAILED DESCRIPTION OF THE INVENTION

Figure 1:
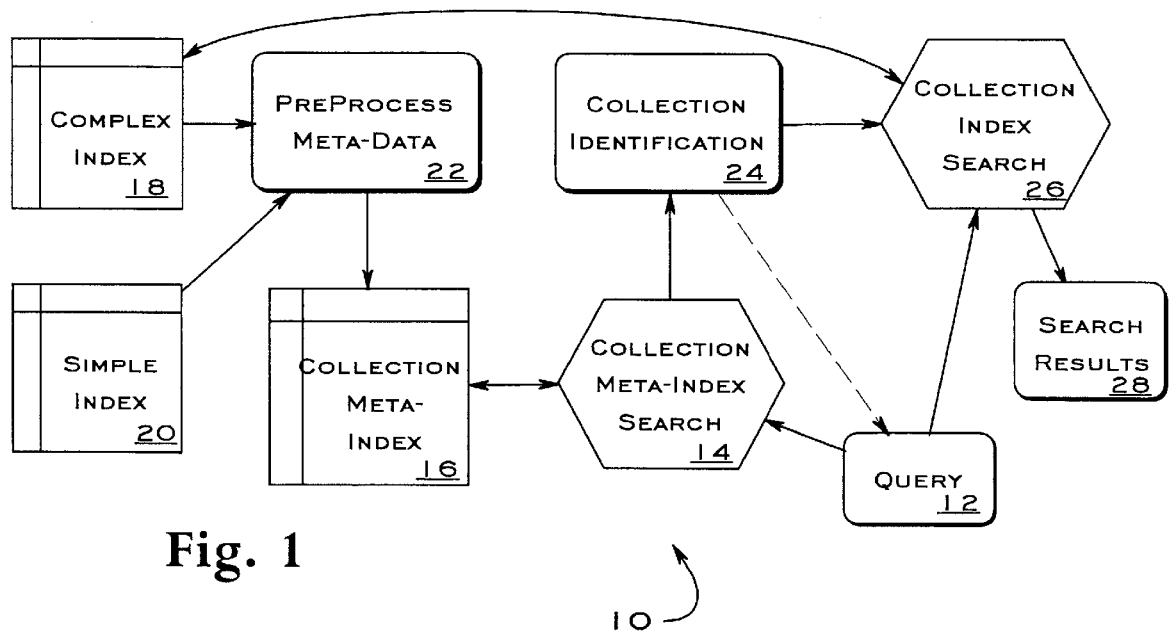
FIG. 1 is a flow diagram illustrating the operation of a preferred embodiment of the present invention in supporting a meta-index database construction and user search.

An Internet-based computerized document collection search methodology 10 is generally illustrated in FIG. 1. The methodology 10 is preferably implemented, in a preferred embodiment of the present invention, as an application program or cooperative set of application programs executing on one or more conventional networked computer systems. In operation, a user query 12 is used to select a qualified set of most likely relevant document collections. This collection selection operation is performed by a meta-index collection selection search engine 14 against a master index database 16, preferably referred to as a collection meta-index. The user query 12 is then used by a collection index search engine 26 against the identified collection set to select some number of most likely relevant documents from the identified collection set. A listing of the identified collection documents then forms the search report 28 that is then returned in response to the user query 12.

In greater detail, a user query 12 may be preferentially formed using any combination of a free text syntax, such as "growing orchids indoors," "new Sun products," and "a computer system with a RISC processor in it," fielded text qualifiers, and various pre- and post-search qualifiers that can be used to limit the scope of the collections to be searched and selected. Any qualifiers and descriptors available to the meta-index collection selection search engine 14 can be used. Typical pre-search qualifiers can define document language (English), document type (research journal; not press releases), and cost (search free; document retrieval less than $0.10). The resulting set of qualified document collections, as determined by the collection meta-index search engine 14, is then used in evaluating the free text portion of the query 12. Application of post-search qualifiers, such as the maximum number of collections to select for searching, can be deferred. Explicit user identification of qualifiers as pre- or post-search is unnecessary, since such identification can be inferred from the type of the qualifier.

The free text user query 12 is then selectively processed utilizing a space character as a default search term separator. The query processor also operates to remove or conform internal punctuation, such that "I.B.M." and "IBM" as well as "$1,000" and "$1000" are equivalently recognized. Common variably represented terms, such as online, are also equivalently recognized; online being made equivalent to 'on line' and "on-line" for purposes of term equivalence mapping. Capitalization and other indirect hints, as well as direct or explicit hints, such as a "+" or "−" term prefix to require or negate existence of a term in the query results, may be used to variously augment and refine the meaningful context of the user query. The various search terms are thus reduced and expanded as appropriate into a list of specifically identified search terms.

For purposes of collection selection resolution, these identified terms are not then stemmed, preserving potential prefix and suffix contextual information. Preferably, search queries are parsed so that "PDP-11/44M+," "Internet-in-a-box," and "SVR4.0.2.1," as well as "options" (preserving context in connection with "stock options") and "greater" (preserving context in connection with "greater Bay Area"), are all identified as individual and distinct search terms for purposes of collection set selection.

Punctuation specified within a definable list, such as "[{<−=|>}],:;!?"',", is used to define punctuation and potentially other characters that are preferably ignored as term delimiters where the punctuation or other listed character occurs anywhere as part of a search term.

In accordance with the present invention, some identified search terms, though otherwise proper, are also selectively ignored. These terms, largely conjunctions and other context-free words, are generally referred to as stop-terms. A stop-list of stop-terms is defined for use by the query processor in processing the query 12. By recognizing and discarding context free stop-terms, the individual search terms of context laden phrases, such as "computer system RISC processor" from "a computer system with a RISC processor in it," can be identified and manipulated to maintain proximity and relative order information at least for purposes of initially selecting a collection set for searching. As indicated, at least relative proximity information is maintained.

The fielded text portion of a query 12 may include categorically predefined qualifier terms as explicit search limiters. Various applicable predefined fielded search qualifier terms, such as "Collection Type," "Author," "Publication Name," "Publication Date," and others can be inferentially recognized by the query processor. Where a qualifier term is recognized, a corresponding fielded search term limitation is combined with the free text portion of the query through the use of defined boolean and relative relation operators.

The effective search terms of the processed query 12 are then provided to the collection meta-index search engine 14 for analysis against a collection meta-index 16. The meta-index search engine 14 may be any conventional index based search engine. The collection meta-index 16 itself is preferably formed as a compilation of documents where each document stores meta-index data derived from the index or indexes that describe a corresponding base collection. The meta-index 16 thus contains a set of documents that directly correspond to the set of document collections potentially searchable in response to any user query 12.

The collection meta-index 16 documents can be prepared through a preprocessing 22 of base collection indexes 18, 20, often referred to generically as meta-data, that were previously and independently generated by various different indexing algorithms to describe corresponding base document collections. The particular algorithms used in generation of the indexes 18, 20, which may have fundamentally different structures and informational type content, are not of particularly essential importance to the use and operation of the present invention. Preferably, the meta-data of the indexes 18, 20 are directly preprocessed 22 to produce meta-index documents, also referred to as collection summary records, of standardized format. Information characteristically (language), if not explicitly (cost), describing the collection is stored in the respective summary records as fielded text or data.

Thus, the preferred standardized summary record structure preserves a combination of fielded data, term frequencies for contextually distinctive search terms, and proximity information relating the various search terms indexed. A collection summary record may be generated by either a collection content provider or a collection access provider, though the collection content provider will have more immediate access to the base collection indexes, knowledge of the specific structure of the base collection's index files, and knowledge of the specific documents added to the base collection since any prior generation of a corresponding summary record structure.

Preferably, the summary record structure is or will be standardized for use by all collection access providers who may provide access to particular base collections. By utilizing standardized summary record structures, the base collection content providers have a standardized basis for supporting collection searching independent of the search algorithms utilized by any particular content access provider. Similarly, the standardized structure allows content access providers to accept collection summary information from any number of different collection content providers independent of any particular indexing algorithms utilized in creating specific base collection indexes.

Fields within the summary record structure provide for the storage of fundamental collection statistics, fielded data lists, a term list, and term proximity relations. The fundamental collection statistics include, directly or indirectly, the definitive name of the collection and information regarding the collection content provider, an optional summary description of the collection, the number of documents within the collection, the number of terms, preferably excluding stop-terms, that occur in the collection, the number of occurrences of each term in each documents of the collection, the number of times each term appears in the collection, and the length of each document in the collection. The fielded data lists include a data entry for each of the documents in the collection for each type of fielded data. The term list provides a comprehensive, ordered listing of all of the terms, excluding stop-terms, that occur in the collection correlated to the documents of their occurrence. Finally, the term proximity relations identify term phrases that occur in corresponding documents of the collections. The term phrases are consecutively ordered search terms, excluding stop-terms and that do not span a sentence terminator, fixed in sets of two or more terms as they occur in the documents of a base collection. In a preferred embodiment of the present invention, term phrases can be chosen to be short series of two or possibly three terms.

Where collection summary records are prepared by the collection content providers, or perhaps by a third party service company who operates on behalf of some group of collection content providers, each collection summary record can be pushed, preferably using a secure Internet protocol, to each of the existing authorized collection access providers. The summary records can be prepared and pushed to the collection access providers on at least an as needed basis to reflect significant updates in the contents of a base collection. Each time a collection access provider properly receives an updated summary record, their collection meta-index is correspondingly updated and any prior existing summary record is overwritten or deleted.

Alternately, the content access providers may pull new and updated summary records from base collection content providers. Again, the actual transfer of the summary records is preferably by a secure Internet protocol. This allows the collection content providers to potentially derive revenue based on the rate of update pulls and therefore the currency of the summary record information that any particular content access provider receives.

The content access provider may directly utilize the collection summary records to create collection summary records for the meta-index 16. However, in a preferred embodiment of the present invention, the base collection summary records are further processed by specific collection access providers separately or in parallel with the generation of the base collection indexes to optimize the organization of the collection meta-index to any particular search algorithms implemented by the access provider as part of the collection meta-index search engine 14. Specifically, multiple sets of meta-index documents may be generated for any given collection. For example, meta-index documents can be constructed to reflect the base documents themselves, to reflect any internally referenced documents, and multiple subject matter covered by a document. By installing all of the meta-index documents produced from the summary records in the collection meta-index 16, each meta-index document provides a separate basis for considering the relative relevance of a set of base collection documents.

The collection meta-index search engine 14 operates on the collection meta-index 16 to identify a particular set of base collections that contain documents that are likely most relevant to the user in response to the query 12. That is, the collection meta-index search engine identifies and ranks through a ranking algorithm an ordered list of individual meta-index documents, representing respective collections, that are considered to be the most relevant to the search terms of the user query 12. Since each meta-index document identifies a corresponding base document collection, a ranked set of collections is then determined as likely containing the most relevant documents to the user's query 12.

In operating on the collection meta-index 16, the collection meta-index search engine 14 may further limit the meta-index documents or preselect against those documents under consideration to those that meet the fielded data requirements of the user query 12 as qualified by whatever applicable boolean and logical operators are specified in the query 12. Since the fielded data is preferably typed and organized in a uniform structure, the collection meta-index search engine 14 may perform a simple linear search against the meta-index documents to initially locate appropriately conforming base collections.

Alternately, the collection meta-index 16 may itself be indexed at least on the fielded text and data. In this case, the collection meta-index search engine may perform an index based query to identify those documents represented in the collection meta-index that again-meet the presently applicable fielded text and data requirements of the user query 12.

The remaining free text derived portion of the query 12 and query specific fielded text qualifiers are then used to evaluate the likely relevance of any remaining collection meta-index documents to the user query 12. The search terms are selected against the fielded text, term, and phrase lists of the meta-index documents. This selection results in a ranking of the meta-index documents in order of the likely most relevant to the likely least relevant in view of the specific user query 12.

The list of likely most relevant collections is then identified 24 from the list of likely most relevant meta-index documents that are within a predetermined or specific user defined maximum number of collections to select at one time for searching, or that meet at least a minimum relevance ranking threshold, or both.

In a preferred embodiment of the present invention, the list of selected collections is then effectively combined with the user query 12 and submitted to a collection index search engine 26. Alternately, subject to user preference definition, a new or refined query 12' can be constructed by the user to redefine the collection selection already made or to provide a new or refined query 12" to the collection index search engine 26 for use against the presently selected document collection set as determined by the initial query 12 or a query 12'. This supports a tiered approach to collection set identification and searching of the identified collection set. That is, the list of selected collections may be presented back to the user for manual adjustment and approval prior to being submitted with the initial query 12 or a subsequent query 12" to the collection index search engine 26. Consequently, the present invention supports automatic, semi-automatic, and tiered collection selection resolution along with flat and hierarchical queries without requiring the user to select base collections to search beyond selection of a particular collection access provider.

The collection index search engine 26 may be a conventional search engine configured to operate against the collection indexes specified by the list of selected base collections. Search results 28 are then produced in accordance with the conventional operation of the collection index search engine 26. In accordance with an alternate embodiment of the present invention, the collection meta-index search engine 14 and collection index search engine 26 may be one and the same search engine. In this instance, the single search engine 14, 26 is selectable, perhaps by the specification of the meta-index or indexes to search, to perform either a meta-index search in accordance with the present invention or a conventional base collection index search.

The present invention thus significantly provides for the creation and subsequent update of a summary record comprehensively for each base collection, not on a per collection access provider basis. Thus, each collection content provider need only prepare and update a single collection summary record for distribution to all authorized collection access providers.

In addition, the provision of a standardized summary record to the collection access providers still allows each collection access provider to apply their own proprietary algorithms for computation of applicable search term weights, term stemming, and proximity weights for each term of a collection. A collection access provider is thus not bound by fundamental or even extraneous aspects of the proprietary algorithms utilized by a collection content provider in generating any particular base collection index. Since the standardized summary records are constructed to carry a substantial amount of fundamental information about a collection, generally beyond that presently used by conventional search engines, including unstemmed terms, hyphenated terms, capitalization and proximity information, the collection access providers are not hindered in any way by limitations on the form and content of the data provided by the proprietary general base summary records. Indeed, the preferred summary records of the present invention are advantageously generated during or in parallel with the base collection indexing process, rather than being extracted solely from existing base collection inverted indexes and other summary information.

Finally, the present invention allows combining the results of multiple meta-collection searches to create a final likely most relevant collection ranking where multiple intersecting user queries 12 are needed or desired in producing a final combined search result 28.

Figure 2:
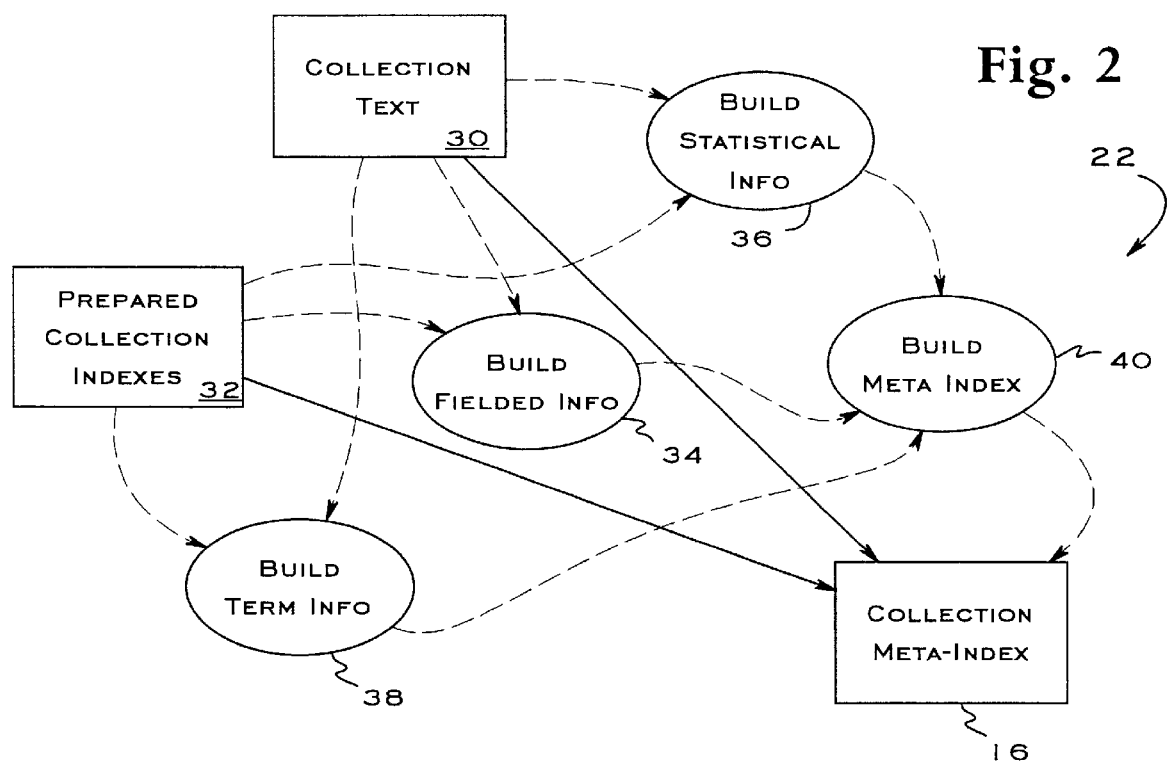
FIG. 2 is flow diagram illustrating the generation of a multi-tiered meta-index composed of multiple data types from either or both of existing collection text and prepared collection indexes in accord with a preferred embodiment of the present invention.

FIG. 2 provides an overview of the process 22 used to generate a collection meta-index 16. Source collection data, in the form of collection text 30 and prepared standard and proprietary collection indexes 32, as available, is processed to define as necessary the collection summary fielded text and data 34, the statistical data 36, and term lists 38. This information is then combined through a potentially proprietary process step 40 to finally produce the collection meta-index 16.

Figure 3:
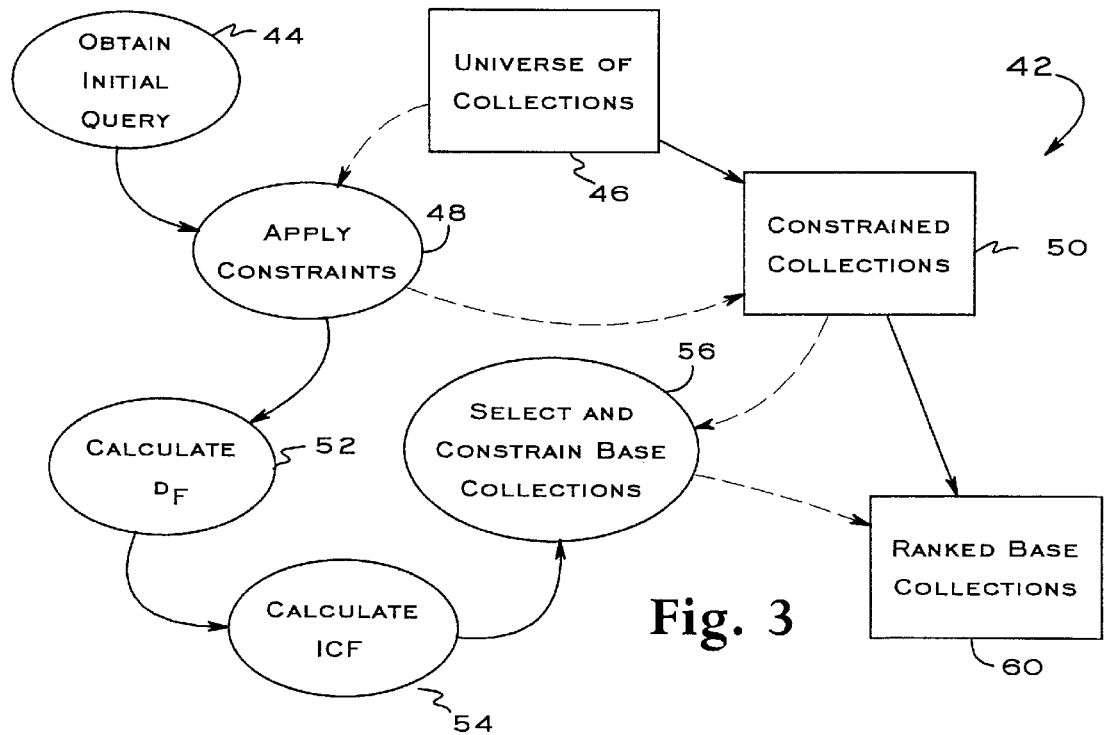
FIG. 3 is a flow diagram illustrating the tiered query operation of a preferred embodiment of the present invention in efficiently and cost effectively producing a ranked set of document collections that are most likely to be relevant to the object of the query.

The preferred collection selection process 42 is shown in FIG. 3. The initial user query 12 is received 44 and constrained 48 by any pre-search constraints applicable to the universe of collections 46 currently available through the user selected Internet access provider. A constrained set of collections 50 is thus formed. This set of collections 50 may be no more than a logical identification of the collection summary records stored by the collection meta-index 16 representing the universe of collections 46.

From the constrained collections 50, a document frequency term is calculated 52 based on the free text and un-applied fielded text provided as part of the user query 12. Document frequency ($d_F$), for purposes of the present invention, is defined as a normalized percentage of documents in the current collection ($d_{CI}$) that have at least one occurrence of the term (t). A minimum threshold (Th) of documents in the current collection is enforced to preclude collections containing less than Th documents from dominating the eventual ranking of the collections. A small number, such as 100, is chosen for the value of Th. The document frequency is preferably calculated as given in Eq. 1. The preferred normalization is performed using logarithmic scaling.

$$d_F = \log \left[ \frac{d_{C1;t}}{(d_{C1} > Th;\ d_{C1}\ ?\ Th)} \cdot (.01) \right] \quad \text{Eq. 1}$$

Next, an inverse collection frequency term is then calculated 54 based on the constrained collection set 50 and the free text and same un-applied fielded text used in calculation of the document frequency ($d_F$). The inverse collection frequency (ICF) is defined in Eq. 2 as a normalized value given by the total number of documents in the collection set divided by the total number of documents in the collection set that have at least one occurrence of the term (t). To maintain proportionality with the calculated document frequency ($d_F$), the inverse collection frequency is also preferably normalized using a logarithmic scale. However, the calculation is performed over the full set of the constrained collections ($d_{Cx}$) The ICF theref or needs to be calculated once for a particular constrained collection 50.

$$ICF = \log \left[ \frac{\sum_{x=1}^{n} d_{Cx}}{\sum_{x=1}^{n} d_{Cx;t}} \right] \quad \text{Eq. 2}$$

A rank is then determined for each collection within the set of constrained collections 50. The collection rank R for a current collection ($d_{CI}$) and term (t) is defined in Eq. 3.

$$R_{(C1,t)} = d_{F(C1)} \cdot ICF_{(t)} \quad \text{Eq. 3}$$

Where collection ranking involves multiple terms (t), a final rank $R_F$ for a particular collection $d_{Cx}$, is the sum of the rank values $R_{(Cx,t)}$ for each term (t). Thus, calculation of a final rank value RF for a particular collection is defined in Eq. 4.

$$R_{F;Cx} = \sum_{t=t1}^{tn} R_{Cx;t} \quad \text{Eq. 4}$$

The post-search constraints, such as maximum number of collections returned and minimum level of relevance, are then applied to the rank ordered set of collection rankings. This produces an at least logical identification of the ranked base collections 60 determined to be most likely relevant to responding to the original user query 12.

Figure 4:
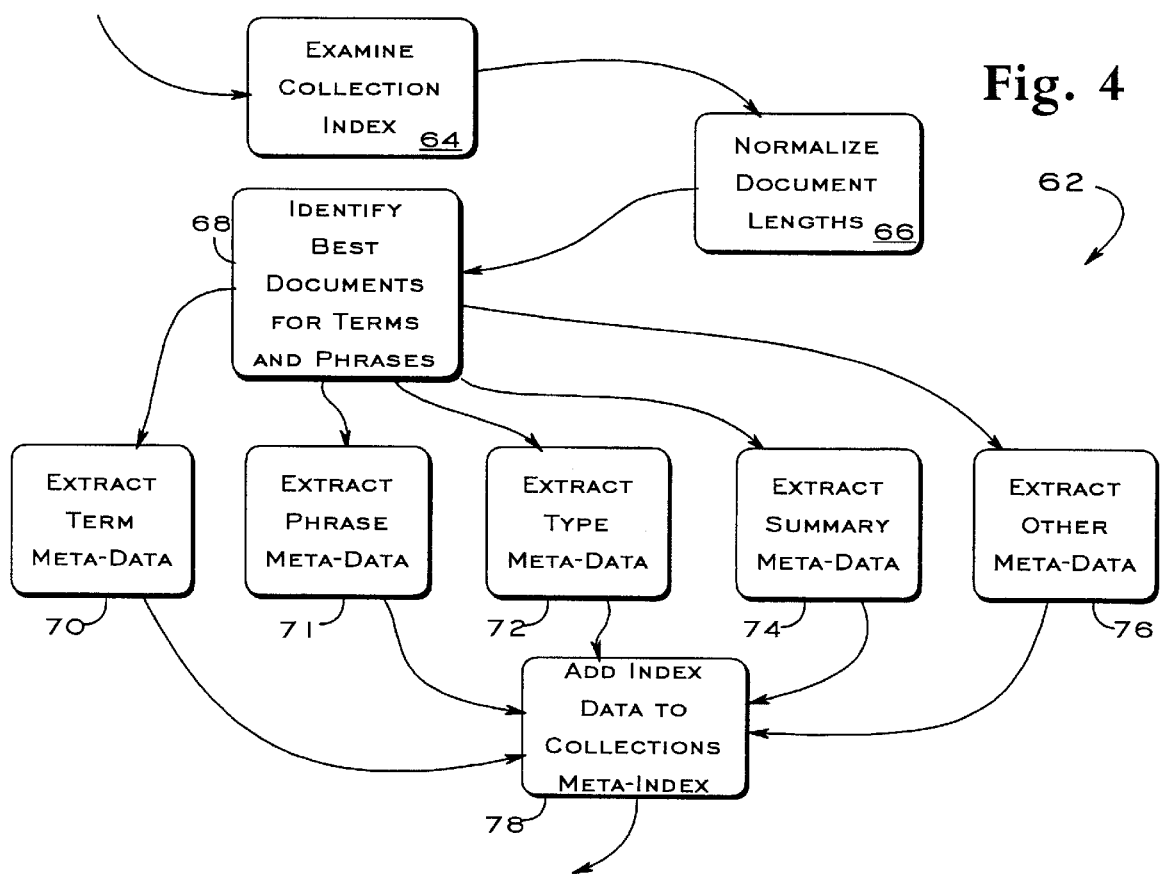
FIG. 4 is a flow diagram illustrating the operation of a preferred embodiment of the present invention in generating and updating a meta-index composed of multiple data types.

FIG. 4 provides a more detailed view of the preferred steps 62 used in preprocessing meta-data or, alternately, the underlying base collection document data, to create a base collection meta-index 16 document describing the contents of a corresponding base document collection. To begin, a determination is made 64 as to whether some pre-existing meta-data description of a collection is suitable for use in creating a sufficient summary record. Where no other access to the collection documents is available, the collection meta-data is presumed sufficient, even where substantial information is absent. Where access to the collection is not limited to just the meta-data, the meta-data may be determined to be sufficiently complete in preserving descriptive attributes of the collection, including collection descriptive statistics, capitalization, distinctive terms, distinctive phrases or sufficient location information to reconstruct occurrences of distinctive phrases, and proximity information relating to the location of terms as they appear in the collection documents, so that an acceptable meta-index summary record can be derived from the base collection meta-data.

Where the derivation of the summary record from the meta-data requires some substantial reconstructive work. The summary record may be better and easier derived from the underlying base collection documents either in combination with the generation of the collection meta-data or as a separate process. This is particularly true where the collection content provider undertakes the generation of the base collection summary record.

Once the source of sufficient descriptive information is identified 64, a basis for establishing term densities for document specific terms is determined generally from the lengths of the documents within the collection. Preferably, a normalized document length is determined 66 either by choice by the collection content provider based on knowledge of the collection or by empirical default as the document size exceeded by approximately 80% of the documents within the collection. For a collection composed substantially of published articles and related documents, the normalized document size may be around ten typical publication paragraphs. Where the collection is substantially composed of technical specifications, such as the ANSI specifications, the normalized document size will be far larger.

The term densities of specific terms can then be calculated against the collection's normalized document length 68. A generic stop-list is used to exclude potential terms that do not carry contextual weight. Preferably, the generic stop-list is augmented for a particular collection with terms that may be deemed too common to provide significant basis for distinguishing content between the documents of that particular base collection. For example, in a collection of pharmaceutical reports, terms such as "FDA," "drugs," and other similar terms that are extensively used in that collection might be added to the stop-list. Conversely, "in-vitro" would not be added to the stop-list unless substantially all documents within the collection are known, typically by pre-analysis of the base collection itself, to concern "in-vitro" technology. In most instances, the collection content provider is in the best position to identify terms that frequently appear in the collection documents, yet do not serve to accurately characterize or distinguish the contents of the base documents within the collection from one another.

Term densities are then determined for the remaining terms that occur within the collection. Of course, other algorithms or strategies for further identifying terms of likely significance within the collection can also be used to limit the number of terms where term densities are determined. By basing term density determinations on normalized document lengths, the present invention provides a significant sensitivity to documents that address a certain aspect of a subject even where the remainder of the documents in the collection are silent on this aspect. Terms that are used frequently even in only a single document of the collection are thus still identified by a high term density. A list of significant specific terms is then created with a term order or ranking based on relative term density 70.

In addition to the specific terms identified by substantial relative term densities, general terms, consisting of single words and multi-word phrases, are considered 71 for their potential to characterize documents within the collection. Again subject to the use of a stop-list, the densities of identifiable general terms within the base collection are determined. Additional qualifications on the use of the stop-list include not excluding instances of stop-list words that are hard-hyphenated with non-stop list words or that are capitalized, but do not appear at the beginning of a sentence. Preferably, phrases are limited to contiguously occurring sets of two terms, i.e., not including any intervening stop-list words, though phrases of longer lengths could be considered. Also preferably, two term phrases that are frequently part of three or more term phrases are not eliminated as general terms. This allows relatively contextually important words to be identified through their overlapping occurrence as single word terms and as part of multiple word phrases. Thus, a natural increased weighing is derived for the term "computer" where the term is used alone and as part of "computer program" and "RISC computer." The general terms are then formed into a list with an order or ranking based on relative general term densities 71.

A summary record for the collection as a whole can then be created 70, 71, 72, 74, 76 by combination of the various information that is recorded in a summary record. The specific term list is evaluated 70 to identify those specific terms that are most significant. Significance may be determined by the establishment of a minimum or threshold term density. Significance may also be determined by selecting some number of the a specific terms that have the highest relative term densities.

The general term list is evaluated 71 to also select out the most significant general terms for the collection. Again, significance may be determined on the basis of general term density threshold or as some number of general terms that have the highest relative term densities. In a preferred embodiment of the present invention, the significant specific and general terms are determined interdependently. The number of significant terms is limited to a combined total of a set number of terms, e.g. terms appearing in at least 1% of the documents or possibly a fixed number such as 5,000. These terms are selected from a combined list of both specific and general terms ordered by term densities. These significant terms, existing as a collection content dependant combination of single word terms and term phrases, are then used as part of the summary record 70, 71.

In addition to storing the significant terms, various other data is stored directly with or in direct correspondence to the significant terms. This additional data may include relative term proximity information and express term weights calculated based on each term's frequency of occurrence within the base collection as a whole.

Finally, various information that serves to categorically 72, statistically 74, and otherwise 76 describe the collection is added to the summary record. The category information includes all of the fielded data that is specific to the individual documents within the collection or of the collection as a whole. In a preferred embodiment of the present invention, the fielded data stored for individual documents and the collection as a whole includes, but is not limited to, collection name, document type, document title, authors, date of publication, publisher, keywords, summary description of collection or document, document length, price, language, country of publication, and publication name. In addition, the preferred stored collection specific statistical data includes, but is not limited to, the number of documents in the collection, the total size of the collection, the average document size and average number of words in the base document collection.

The summary record information 70, 71, 72, 74, 76 is then formatted into a concise standardized record format. The resulting standardized summary record 78 can then be added directly as a document to a collection meta-index 16. The summary record can also be further processed at the discretion of each particular content access provider to a proprietary format and then added as a document to their own collection meta-index 16.

Figure 5:
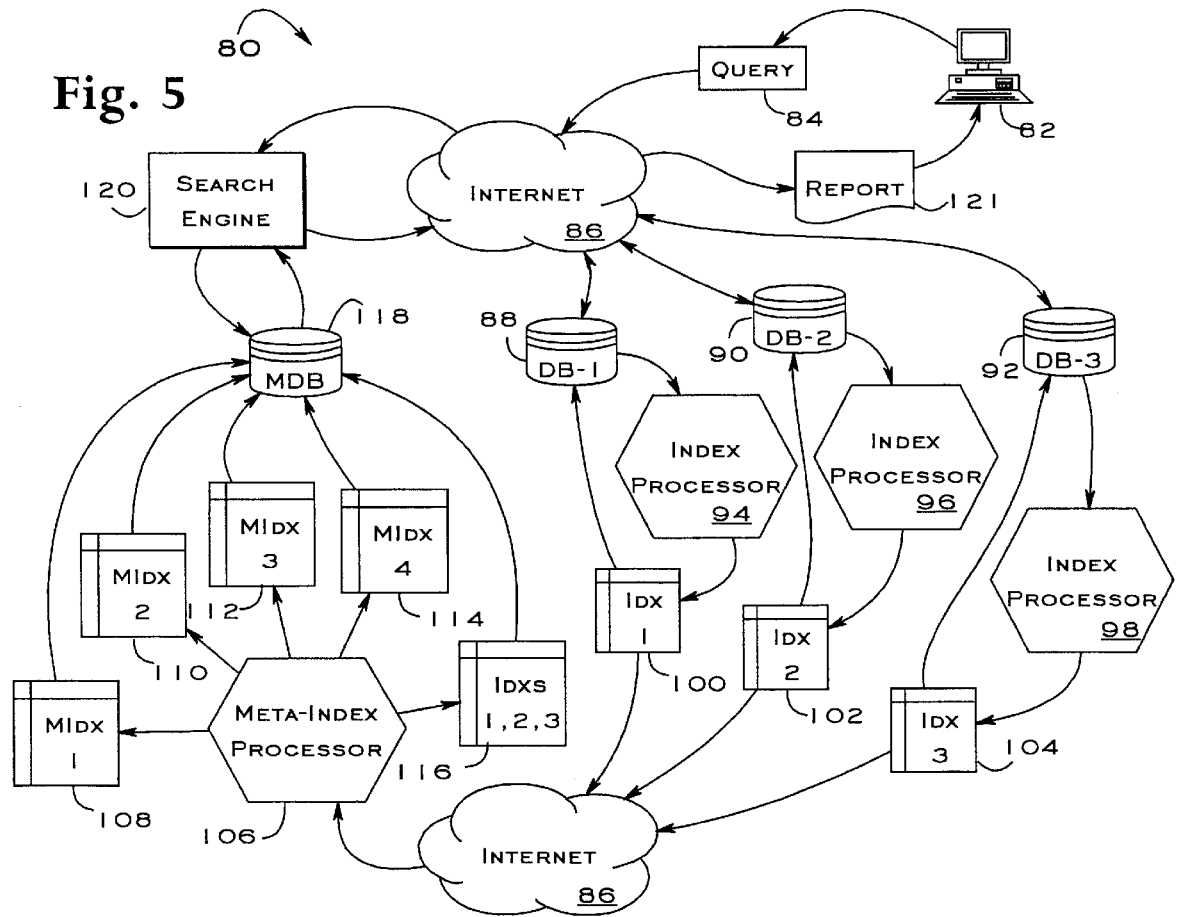
FIG. 5 is a detailed diagram illustrating the preferred and alternate distributed system operations that support automated and semi-automated collection selection and client collection searching.

In FIG. 5, a complete multiple collection system 80 that supports automated collection selection resolution and searching over multiple independent collections is shown. A user, represented by a computer workstation 82, generates a query 84 that utilizes the Internet 86 as a transport mechanism. The query 84 conventionally is directed against any one of the three illustrated collections 88, 90, 92 where the collections are presented through independent collection access providers. Where one or more of the collections 88, 90, 92 are accessible through a common content access provider, the user query 84 is preconditioned upon issuance from the user workstation 82 to specify the particular set of collections 88, 90, 92 that the query is to be resolved against. Also conventionally, index processors 94, 96, 98 are utilized to create the respectively proprietary indexes 100, 102, 104 that are used in execution of the query 84 execution against the collections 88, 90, 92.

In accordance with the present invention, the individual collection indexes 100, 102, 104 are transported over the Internet 86 or by other secure means to a meta index processor 106. The indexes 100, 102, 104 may be the ordinary indexes utilized separately in connection with accesses of the collections 88, 90, 92. Alternately, the collection content providers or others who control the index processors 94, 96, 98 may choose to generate separate indexes for the collections 88, 90, 92 that directly conform to the desired content definition and structure desired by the meta index processor 106. Where the existing indexes 100, 102, 104 are to be utilized, the collection content provider or meta index searcher, who operates the meta index processor 106, conforms to the greatest extent reasonable the content and structure of the indexes 100, 102, 104 to that desired by the meta index processor.

The meta index processor 106 operates on the provided indexes to generate multiple meta indexes 108, 110, 112, 114 that are stored in a meta index data base 118. The individual collection indexes 116, as restructured for the meta index processor 106 are also stored by the meta index database 118.

Figure 6:
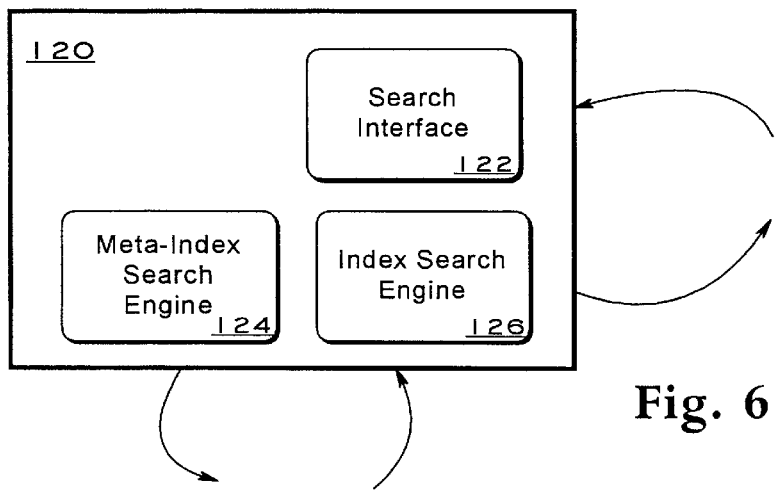
FIG. 6 provides a simplified illustration of a multi-function collection search engine constructed in accordance with a preferred embodiment of the present invention.

The various meta indexes 108, 110, 112, 114, each provide, in effect, a view to the contents of the combined collections 88, 90, 92. Thus, the query 84, presented without necessary precondition as to the particular set of collections to search is passed through the Internet 86 to a search engine 120 operated by the meta-index searcher. As shown in FIG. 6, the search engine 120 preferably includes a preference selectable and definable interface 122 for receiving a query 84 and managing the collection selection process. Where the query 84 allows or requires collection selection resolution, a meta index search engine 124 is provided with the query 84 for use and operation against the meta indexes 108, 110, 112, 114 stored by the meta index database. The meta index search engine 124 produces a ranked listing of the most relevant collections 88, 90, 92 that could be utilized in satisfying the query 84. The collections are ranked based on a relevancy score calculated base on the number of search term matches.

Depending on the preferences established in connection with servicing the query 84, the search interface 122 may refine the collection selection list produced by the meta index search engine 124 based on a number of preference criteria. These criteria may include limits on the number of collections to be concurrently searched, a minimum relevance score, collection access cost constraints and the like. The search interface 122 may also provide for a transaction over the Internet 86 to the user workstation 82 to allow the end user to variously review, refine and confirm the collection selection list. The opportunity to confirm the collection selection list is itself preferably just another preference that can be established within the search interface 122 from the user workstation 82.

Once a confirmed collection selection list is obtained, the query 84 is preferably executed by an index search engine 124 against the indexes 116 selectively limited to those indexes corresponding to the collection selection list. The index search engine 120 thus obtains a scored and ranked list of documents from the collections 88, 90, 92 within the collection selection list that are responsive to the query 84. The search interface 122 may again refine this collection document list based on preferences established from the user workstation 82. These preferences may define refinement criteria such as minimal acceptable relevancy score, total number of documents identified, maximum number of documents from a particular collection, and the like. The refined document list is then provided by the search interface 122 through the Internet 86 as a report 121 to the user workstation 82. Thus, the end user can analyze the report 121 and selectively retrieve identified documents from the various collections 88, 90, 92 as desired.

Thus, a method for providing for the automated or selectively semi-automated selection of document collections to be searched in response to a particular user query has been described. While the present invention has been described particularly with reference to Internet accessible document collections, the present invention is equally applicable to the searching of non-documentary collections that can be treated as document collections accessible through a network other than the Internet and specifically including proprietary and/ or private intranets.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

We claim:

1. A method of selecting a subset of a set of document collections containing documents to search based upon a predetermined query text including a search term, said method comprising the steps of:
   a) accessing a meta-file representative of said set of document collections, including a search term occurrence list;
   b) determining a document frequency term for said search term relative to each of said document collections within said set of document collections and an inverse collection frequency term for said set of document collections, said inverse collection frequency term being proportional to a ratio of the number of documents in said set of document collections and the number of documents in set of document collections that include said search term;
   c) determining a term ranking for each of said document collections that is proportional to the respective said document frequency terms and said inverse collection frequency term;
   d) selecting said subset of said set of document collections based on the relative term ranking of each of said document collections.

2. The method of claim 1 wherein said meta-file includes a list of search terms that occur in said set of document collections correlated to the collection and document of each search term's occurrence.

3. The method of claim 2 wherein said predetermined query text includes a plurality of search terms, wherein said steps (a) through (c) are performed for each of said plurality of search terms, and where a final ranking for each of said document collections is determined as the sum of said term rankings for each of said plurality of search terms, said step (d)being performed based on the relative final ranking of each of said document collections.

4. The method of claim 3 wherein said document frequency terms and said inverse collection frequency term determined for each of said document collections is scaled to increase the numerical distribution of said document frequency terms while maintaining proportionality with said inverse collection frequency term.

5. The method of claim 4 wherein a log function is used to scale said document frequency terms and said inverse collection frequency term determined for each of said document collections.

6. The method of claim 2 or 4 wherein said meta-file includes a plurality of records, a predetermined record being representative of a respective document collection, said predetermined record including said search term occurrence list and a plurality of fielded terms provided to store characteristics of said respective document collection.

7. The method of claim 6 wherein said plurality of fielded terms may be categorized as storing statistical data and pre-search collection qualifying data.

8. The method of claim 7 wherein said statistical data may include the number of documents represented by said predetermined record and the number of occurrences of a predetermined search term that appears in said search term occurrence list, and wherein said pre-search collection qualifying data may include a language type identifier, a publication type identifier, a publication name, a publication date, and a cost identifier.

9. The method of claim 8 wherein said predetermined query text includes a post-search qualifying term, and wherein said step of selecting said subset of document collections includes a step of qualifying said subset of document collections selected based on said post-search qualifying term.

10. A method of selecting a subset of a set of document collections to search based upon a predetermined query text optionally including any of a search term, a pre-search qualifier, and a post-search qualifier, said method comprising the steps of:
   a) accessing a meta-information data file that includes a plurality of records representing said set of document collections, each said document collection representing a plurality of documents;
   b) pre-qualifying a set of said plurality of records based upon said pre-search qualifier, if any;
   c) determining a search term frequency value for each of said pre-qualified set of said plurality of records with respect to said search term if any, said search term frequency values being normalized against a common factor representative of the frequency of qualifying occurrences of said search term within said documents of said pre-qualified set;
   d) determining a search term ranking for each of said pre-qualified set of said plurality of records based upon said frequency values and said common factor; and
   e) selecting said subset of said set of document collections to search based on said search term rankings and said post-search qualifier, if any.

11. The method of claim 10 wherein said document collections have a searchable collection index, and wherein said method further comprises the step of applying said search term against said searchable collection index to select one or more predetermined documents.

12. The method of claim 11 further including a step of optionally modifying any of said search term, said pre-search qualifier and said post-search qualifier and re-performing said steps (b) through (e).

13. The method of claim 12 wherein said normalized document usage frequencies for said predetermined document collection are determined in relation to the frequency of occurrence of said search significant terms within said predetermined document collection.

14. A method for selecting a subset of a set of document collections to search dependant on a predetermined query term, each said document collection including a plurality of documents, said set of document collections being represented as a meta-index that stores search terms and statistical data representative of said set of document collections and said document collections being represented by respective collection indexes that store search terms and statistical data representative of the documents within respective document collections, said method comprising the steps of:
   a) determining a collection ranking for each said document collection with respect to said predetermined query term with reference to said meta-index, each said collection ranking being normalized with respect to the qualified occurrence of said predetermined query term within the documents of said set of document collections;
   c) identifying said document collections within said subset of document collections potentially most relevant for searching based on said predetermined query term.

15. The method of claim 14 wherein said qualified occurrence of said predetermined query term is representable as a ratio of the total number of documents within said set of documents and the number of documents, in said set of document collections, that have at least one occurrence of said predetermined query term.

16. The method of claim 15 wherein each said collection ranking is dependant on the number of documents within a respective collection that have at least one occurrence of said predetermined query term relative to a qualified number of documents within said respective collection.

17. The method of claim 16 wherein said qualified number of documents within said respective collection is dependant on the number of documents within said respective collection subject to a minimum threshold number of documents.

18. The method of claim 17 wherein said collection ranking for each said collection is further dependant on the sum of the said collection rankings separately determined with respect to each of a set of query terms including said predetermined query term.

19. The method of claim 18 wherein said qualified occurrence of said predetermined query term is once per document and said minimum threshold number of documents is 100.

20. The method of claim 17 or 19 wherein said step of identifying said document collections includes selecting as said subset a predetermined number of said documents having the highest relative collection rankings from said set of document collections.

* * * * *